US006813168B2

(12) United States Patent
Balakrishnan

(10) Patent No.: US 6,813,168 B2
(45) Date of Patent: Nov. 2, 2004

(54) METHOD AND APPARATUS FOR PROVIDING INPUT EMI FILTERING IN POWER SUPPLIES

(75) Inventor: Balu Balakrishnan, Saratoga, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 10/299,175

(22) Filed: Nov. 18, 2002

(65) Prior Publication Data

US 2004/0095785 A1 May 20, 2004

(51) Int. Cl.[7] ............................................. H02M 1/12
(52) U.S. Cl. ........................................ 363/44; 363/39
(58) Field of Search ........................... 363/39, 44, 52

(56) References Cited

U.S. PATENT DOCUMENTS

| | | | | |
|---|---|---|---|---|
| 3,273,044 | A | * 9/1966 | Clarke | 363/77 |
| 4,222,096 | A | * 9/1980 | Capewell | 363/44 |
| 5,818,705 | A | 10/1998 | Faulk | |
| 6,400,584 | B1 | 6/2002 | Sabate et al. | |
| 6,594,165 | B2 | * 7/2003 | Duerbaum et al. | 363/125 |
| 2002/0114176 | A1 | 8/2002 | Morita et al. | |

FOREIGN PATENT DOCUMENTS

| DE | 20119996 U1 | 3/2002 |
|---|---|---|
| EP | 03257154 | 2/2004 |

OTHER PUBLICATIONS

Power Integrations, Inc., "TNY 256 TinySwitch® Plus Energy Efficient, Low Power Off–line Switcher", pp. 1–20, Jul. 2001.

Qu, Song et al., "Mixed–Mode EMI Noise and Its Implications to Filter Design in Offline Switching Power Supplies," *IEEE*, 2000, pp. 707–713.

Caponet, Marco Chiado et al., "EMI Filters Design for Power Electronics," *IEEE*, 2000, pp. 2027–2032.

Wang, Shuo et al., "Improving the Performance of Boost PFC EMI Filters," *IEEE*, 2003, pp. 368–374.

* cited by examiner

*Primary Examiner*—Bao Q. Vu
(74) *Attorney, Agent, or Firm*—Blakely, Sokoloff, Taylor & Zafman LLP

(57) ABSTRACT

A power supply electromagnetic interference (EMI) filter circuit and technique. In one embodiment, a method of filtering EMI in a power supply includes rectifying an AC signal from an AC source, smoothing the rectified AC signal with a bulk storage capacitor to provide a DC output as an input to a power conversion circuit and filtering the EMI generated by the power conversion circuit from reaching the AC source by using the bulk capacitor and one or more inductors in combination with the AC source capacitance as an EMI filter. In one embodiment the method also includes the use of one or more of the inductors as a fusing element.

46 Claims, 6 Drawing Sheets

METHOD AND APPARATUS FOR PROVIDING INPUT EMI FILTERING IN POWER SUPPLIES

BACKGROUND OF THE INVENTION

1. Field of the Invention

The present invention relates generally to power supplies and, more specifically, the present invention relates to a switched mode power supply with an input electromagnetic interference (EMI) filter circuit.

2. Background Information

Electronic devices use power to operate. Switched mode power supplies or adapters are widely used to power electronic products as well as charge batteries used to power mobile products such as for example wireless phones, palm top computers, toys, etc. Switched mode power supplies generate EMI, which must be filtered to allow the power supply to meet national and international standards stipulating acceptable levels of EMI. This requires that the switched mode power supply include components at the input of the power supply that filter EMI in order to meet these standards. Furthermore, an input fuse is required to meet national and international safety standards.

Known power supply techniques employ input EMI filter circuits of varying complexity. The simplest form of input EMI filter is known as a pi filter and is used in low-power power supplies to reduce power supply cost. The fuse is a separate component, which is typically either designed solely for use as a fuse or as a resistor specifically designed to meet national and international safety standards as a fusible component.

SUMMARY OF THE INVENTION

A power supply input EMI filter circuit is disclosed. In one embodiment, a method of filtering EMI in a power supply includes rectifying an AC signal with a rectifier, smoothing the rectified signal with a bulk storage capacitor to provide a DC output as an input to a power conversion circuit and filtering the EMI generated by the power conversion circuit from reaching the AC source by using the bulk capacitor and one or more inductors in combination with the AC source capacitance as an EMI filter. In one embodiment the method also includes the use of one or more of the inductors as a fusing element to meet safety requirements. Additional features and benefits of the present invention will become apparent from the detailed description and figures set forth below.

BRIEF DESCRIPTION OF THE DRAWINGS

The present invention detailed illustrated by way of example and not limitation in the accompanying figures.

DETAILED DESCRIPTION

A novel technique to reduce the cost of input EMI filter circuitry in switched mode power supplies is disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In one embodiment, the present invention provides a simplified input EMI circuit, which therefore reduces the cost and complexity of input EMI filter circuitry and the fuse function.

Figure 1:
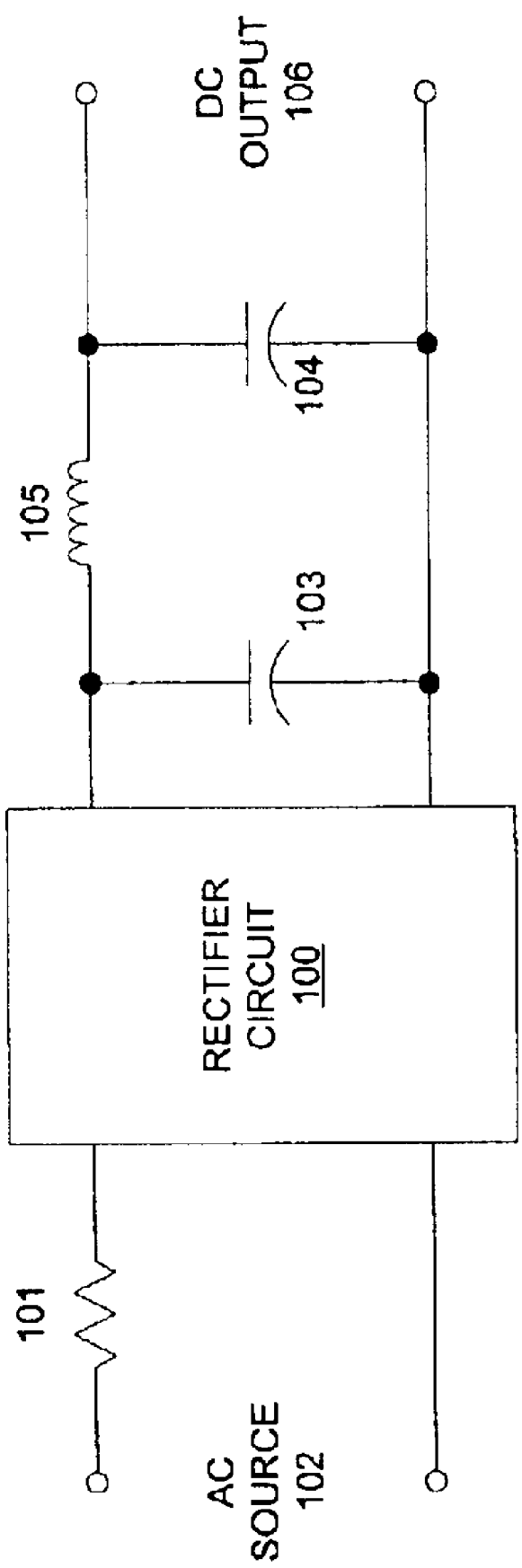
FIG. 1 is a schematic illustrating a power supply input circuit including a fuse and input EMI filter circuit.

To illustrate, FIG. 1 shows a schematic of a power supply input stage including a fuse 101, a rectifier circuit 100 and EMI filter circuitry including capacitors 103 and 104 and an inductor 105. The input EMI filter circuitry is coupled in a configuration that is known as a pi filter, which can be appreciated to one skilled in the art. As can be appreciated by one skilled in the art, the rectifier circuit 100 can be either a well-known full or half wave rectifier circuit. If a full wave rectifier circuit is used, the rectification bridge of rectifier circuit 100 can be constructed using either discrete diodes or a single component bridge rectifier. If a half wave rectifier circuit is used, the rectifier circuit 100 can be constructed using a single diode or multiple diodes coupled in series. The latter construction is used in certain embodiments to reduce EMI and or to increase the amount of input voltage surges that rectifier circuit 100 can withstand, as will be appreciated to one skilled in the art.

The circuitry shown in FIG. 1 has an AC source 102 at the input and provides a rectified and smoothed or filtered DC output voltage at DC output 106. Such a configuration is typical of low power AC to DC power supply circuits such as those employed in low power (<10 Watts output) adapters and chargers for consumer electronics items and the like. As well as forming part of the pi filter, capacitors 103 and 104 also provide bulk storage of charge derived from the AC source 102 when the voltage across the AC source 102 is greater than the DC voltage across capacitors 103 and 104. When this condition is met, current flows from the AC source 102 through capacitors 103 and 104. The charge thus stored on capacitors 103 and 104 provides a relatively stable DC output voltage at DC output 106 as required for efficient operation of a power conversion circuit that is to be coupled to receive the DC output voltage at DC output 106.

The fuse 101 shown in FIG. 1, which is coupled between AC source 102 and rectifier circuit 100 is a fusible resistor. In order for a resistor to fulfill the international standards required of a fuse component, the resistor is normally of a wore wound construction and covered in a flame retardant or heatshrink material that prevents pieces of the resistor being scattered when the fuse 101 is blown during a fault condition. The position of the fuse 101 is also important to ensure compliance of the power supply with international safety standards.

To comply with international safety standards, the fuse 101 must be positioned such that it becomes an open circuit in the event of an abnormally high current being drawn from AC source 102 due to a fault on any component in the rectifier circuit 100, EMI filter consisting of components 103, 104 and 105 or any component in the power supply circuit coupled to DC output 106. FIG. 1 therefore shows the most obvious position for fuse 101 to ensure that it limits an abnormal current in the case of a fault in any component coming after fuse 101.

Figure 2:
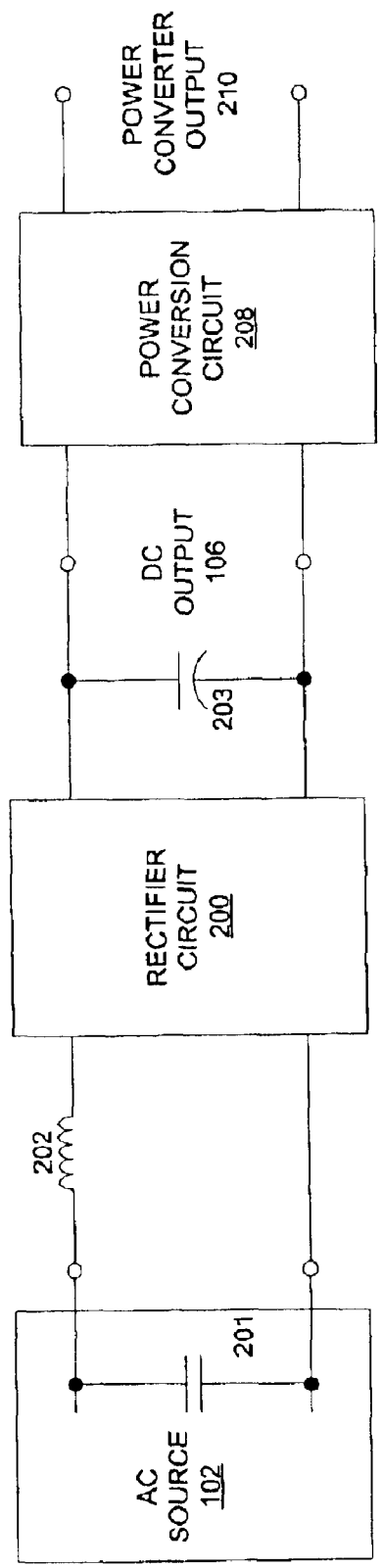
FIG. 2 is a schematic illustrating one embodiment of a power supply with a simplified input EMI filter circuit and fuse in accordance with the teachings of the present invention.

FIG. 2 shows a schematic illustrating one embodiment of a power supply input stage utilized in a power supply in accordance with the teachings of the present invention. In the illustrated embodiment, an AC signal from an AC source 102 is rectified by rectifier circuit 200 and is then smoothed at DC output 106 by capacitor 203. The circuit shown is a simplification of that shown in FIG. 1 through the elimination of the fuse 101 and also one of the bulk storage capacitors 103 and 104. In the circuit embodiment of FIG. 2, the input fuse function is provided by inductor 202, which also forms part of an EMI filter as described later. As can be appreciated to one skilled in the art, typical input inductor components used in power supplies, such as for example below 10 Watts output, are typically constructed of a fine wire wound on a ferrite core. As such the construction is similar to the fusible resistor 101 described above. As such, by the correct choice of wire gauge (diameter), inductor 202 can be designed to become an open circuit under specific conditions of abnormal current flow such as those due to a fault in one of the power supply components. In one embodiment, the position of inductor 202, in common with the fuse 101 in FIG. 1, is on the AC source 102 side of the rectifier circuit 200 to ensure circuit protection under any of the abnormal current conditions as described earlier.

The EMI filter configuration of the circuit in FIG. 2 forms a pi filter with the single bulk storage capacitor 203, inductor 202 and AC source capacitance 201 of AC source 102. It is appreciated that AC source capacitance 201 is a distributed source capacitance of AC source 102, rather than a specific component. This AC source capacitance 201 is present in every AC source 102 and is represented by an equivalent capacitance in the equipment used to make EMI measurements. This equipment is called a Line Impedance Stabilization Network (LISN), as will be familiar to one skilled in the art. The AC source or LISN capacitance can therefore be specifically used to form a pi filter with the simplified input circuitry of FIG. 2 in accordance with the teachings of the present invention. Since EMI measurements are made under standardized conditions of input cable length and LISN circuitry, the AC source capacitance 201 is deterministic and provides repeatable measurements to ensure consistent EMI filter performance.

As shown in the depicted embodiment, rectifier circuit 200 is coupled between inductor 202 and capacitor 203. In one embodiment, the capacitance value of capacitor 203 is not necessarily equal to the value of capacitance 104 of FIG. 1. In the depicted embodiment, capacitor 203 is a single capacitor and is adapted to provide the bulk storage function and is therefore usually a larger value of capacitance value than that of capacitor 104 to achieve the same average DC output voltage at DC output 106. However, despite typically being a larger capacitor, the elimination of one bulk storage capacitor typically provides a significant cost saving over the configuration in FIG. 1 since the cost of each capacitor component is strongly influenced by the packaging itself, which is reduced using a single component. Furthermore, the elimination of one bulk storage capacitor reduces the cost of circuit assembly in production by reducing component count. In one embodiment, inductor 202 also does not necessarily the same inductance value as inductor 105 and is chosen in each case to optimize the pi filter performance with the AC source capacitance 201 and bulk storage capacitor 203. In operation, the rectified and smoothed or filtered DC voltage at DC output 106 is received by power conversion circuit 208, which generates an output voltage at power conversion circuit output 210. In one embodiment, power conversion circuit 208 is a switched mode power converter and the EMI filter circuit of FIG. 2 is employed to filter the EMI in accordance with the teaching of the present invention.

Figure 3:
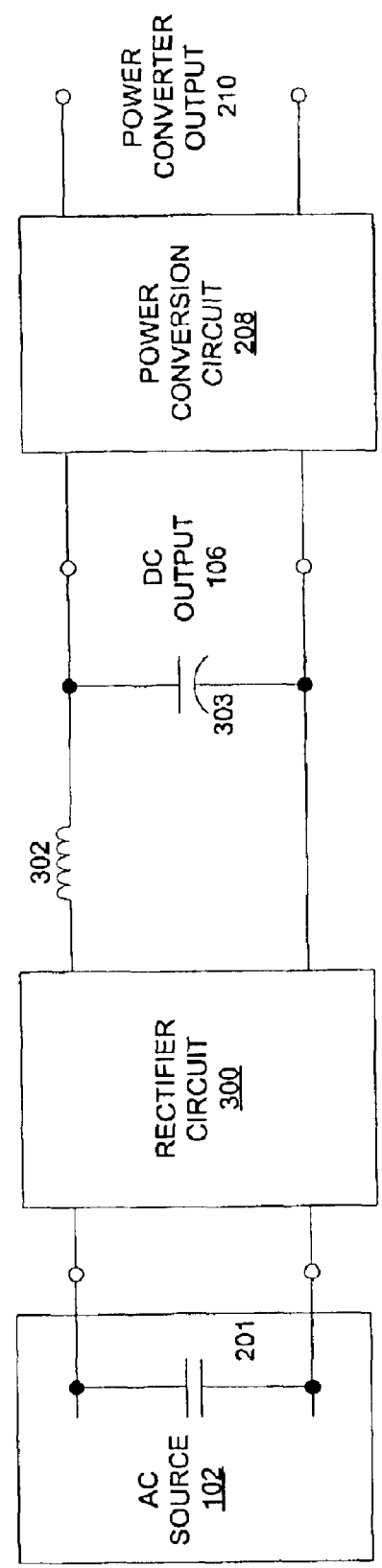
FIG. 3 is a schematic illustrating another embodiment of a power supply with a simplified input EMI filter and fuse circuit in accordance with the teachings of the present invention.

FIG. 3 shows a schematic illustrating another embodiment of a power supply input stage employed in a power supply in accordance with the teachings of the present invention. The circuit shown is again a simplification of that shown in FIG. 1 through the elimination of the fuse 101 and also one of the bulk storage capacitors 103 and 104. In the circuit of FIG. 3, the input fuse function is provided by inductor 302, which also forms part of the EMI filter.

In this configuration however, the inductor 302 is placed on the output side of the rectifier circuit 300. That is, rectifier circuit 300 is between AC source 102 and inductor 302. In one embodiment, this places a limitation on the type of input rectifier circuit 300 that can be used if the inductor is also required to perform the fuse function. This limitation arises since connection of inductor 302 can only provide a fuse function in compliance with international safety standards described earlier if the input rectifier circuit 300 is a half wave rectifier circuit. As can be appreciated by one skilled in the art, if input rectifier circuit 300 is a full wave bridge rectifier circuit, the short circuit failure of any one of the diodes in the rectification bridge will cause abnormally high current to be drawn from AC source 102 without this current flowing through inductor 302. In one embodiment, the circuit shown in FIG. 3 is therefore limited to use when input rectifier circuit 300 is a half wave rectifier circuit if the inductor is also required to function as a fuse.

Figure 4B:
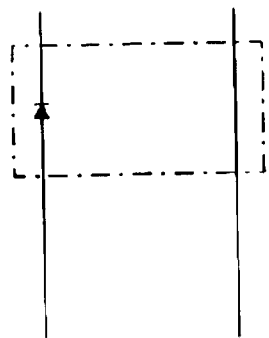
FIG. 4B provides an illustration of one embodiment of a half wave rectifier utilizing a single diode on one of the rails in accordance with the teachings of the present invention.
Figure 4D:
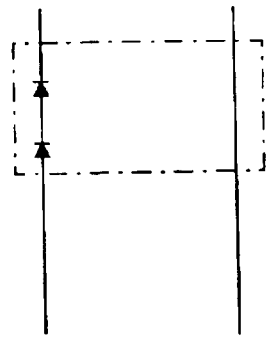
FIG. 4D provides an illustration of one embodiment of a half wave rectifier utilizing a plurality of diodes on at least one of the rails in accordance with the teachings of the present invention.
Figure 4A:
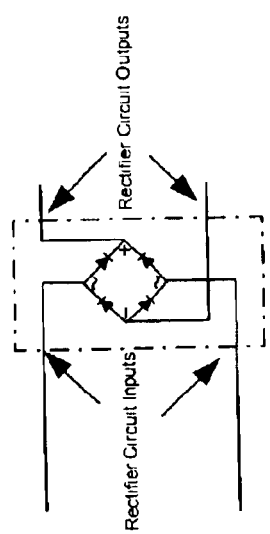
FIG. 4A provides an illustration of one embodiment of a full wave rectifier utilizing a diode bridge in accordance with the teachings of the present invention.
Figure 4C:
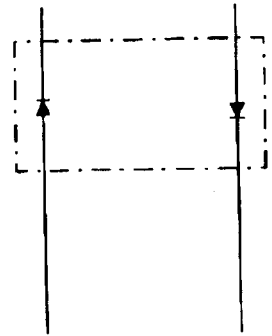
FIG. 4C provides an illustration of one embodiment of a half wave rectifier utilizing a single diode on each of the rails in accordance with the teachings of the present invention.

To illustrate, FIGS. 4A, 4B, 4C and 4D provide various example schematics of various embodiments of rectifiers that may be utilized in accordance with the teachings of the present invention. In particular, FIG. 4A provides an illustration of one embodiment of a full wave rectifier utilizing a diode bridge. FIG. 4B provides an illustration of one embodiment of a half wave rectifier utilizing a single diode on one of the rails. FIG. 4C provides an illustration of one embodiment of a half wave rectifier utilizing a single diode on each of the rails. FIG. 4D provides an illustration of one embodiment of a half wave rectifier utilizing a plurality of diodes on at least one of the rails. It is appreciated that other suitable variations of the schematics illustrated in FIGS. 4A, 4B, 4C and 4D may be utilized in accordance with the teachings of the present invention. Any one of the rectifier circuits shown could be used in the circuits of FIG. 2, 3 or the circuits described below though their application is not limited to only those configurations shown in FIGS. 4A, 4B, 4C and 4D.

As illustrated in FIGS. 4B, 4C and 4D, embodiments of the half wave rectifier circuit can be constructed using a single diode or multiple diodes coupled in series. When using multiple diodes, one or more diodes can be connected on either or both AC input rails. Using one or more diodes on both rails of the AC input reduces EMI by blocking the EMI generated by the power conversion circuit from being coupled to the AC source on both rails during times when the diodes are not conducting.

As will be appreciated by one skilled in the art, in one embodiment, the configuration of FIG. 3 can be used with rectifier circuit 300 as a full wave rectifier circuit, such as for example the rectifier illustrated in FIG. 4A, if a separate fuse component is used coupled in series with the AC source 102 on the input side of rectifier circuit 300. In this embodiment, inductor 302 no longer provides the fuse function and the circuit complies with international safety standards.

Referring back to the embodiment of FIG. 3, an AC signal is provided by AC source 102 and is rectified by rectifier circuit 300 and smoothed by capacitor 303 such that a rectified and smoothed or filtered DC signal is generated at DC output 106. The rectified and smoothed DC signal at DC output 106 is coupled to be received by power conversion circuit 208 such that an output is generated at power conversion output 210. In one embodiment, power conversion circuit 208 is a switched mode power converter.

The EMI filter function in the embodiment of FIG. 3 is made up of inductor 302, bulk storage capacitor 303 and AC source capacitance 201 of AC source 102. In common with the embodiment of FIG. 2, the AC source or LISN capacitance is used to form a pi filter with the simplified input circuitry of FIG. 3. Other benefits of the simplified input circuitry of FIG. 3 are common with those of the circuit illustrated in FIG. 2 as described previously.

Figure 5:
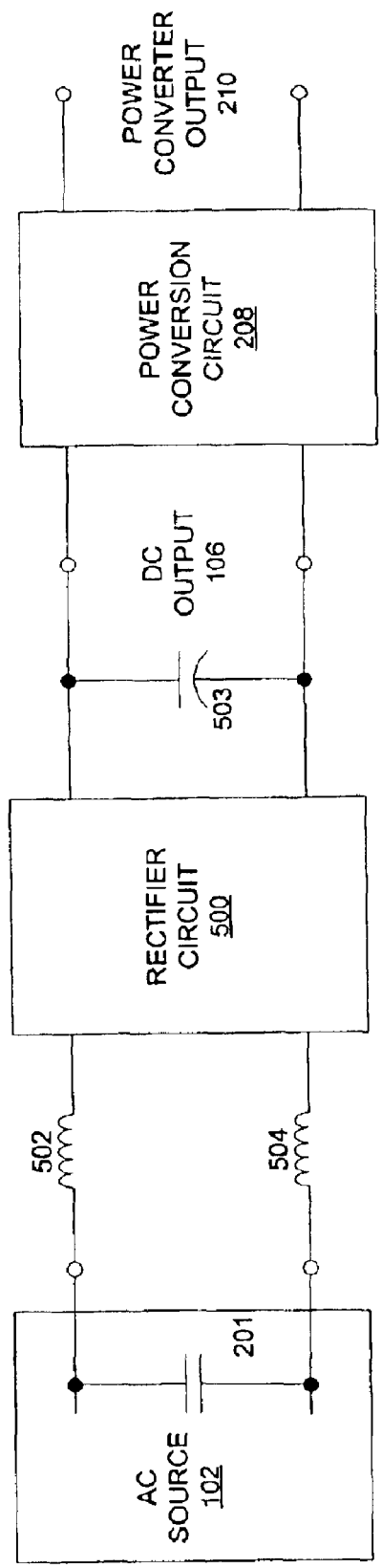
FIG. 5 is a schematic illustrating yet another embodiment of a power supply with a simplified input EMI filter and fuse circuit in accordance with the teachings of the present invention.

FIG. 5 shows a schematic illustrating yet another embodiment of a power supply input stage of a power supply in accordance with the teachings of the present invention. In the embodiment depicted in FIG. 5, the general configuration and functionality share similarities with the embodiment shown and described with respect to FIG. 2. An AC signal is output by AC source 102 and it is rectified by rectifier 500 and smoothed or filtered by capacitor 503 to provide a DC signal at DC output 106 at capacitor 503. Power conversion circuit 208 receives the rectified and smoothed DC signal at DC output 106 such that an output is provided at power conversion circuit output 210.

Two inductors 502 and 504, however, have replaced the input inductor 202 of the embodiment of FIG. 2. In the illustrated embodiment, inductors 502 and 504 are coupled between AC source 102 and rectifier circuit 500. In one embodiment, the total inductance of inductors 502 and 504 is not necessarily equal to the inductance of inductor 202. For instance, in one embodiment, one of the inductors 502 and 504 could be designed specifically to have different impedance versus frequency characteristics than the other in order to filter specific EMI frequencies more efficiently. In this embodiment either one or both of inductors 502 and 504 can act as a fuse. Typically the lowest cost solution is to design only one of the inductors 502 and 504 to act as a fuse in order that only one has the flame retardant or heatshrink covering to comply with international safety standards as a fuse component. This can be accomplished, for example, by using a thinner wire on the inductor that is to function as fuse than the wire used on the other inductor.

Figure 6:
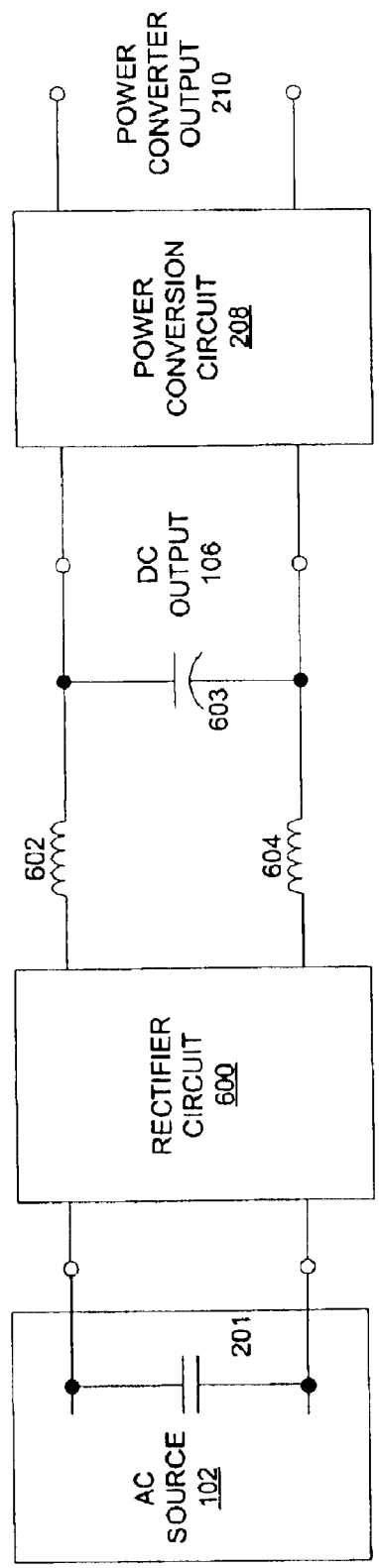
FIG. 6 is a schematic illustrating still another embodiment of a power supply with a simplified input EMI filter and fuse circuit in accordance with the teachings of the present invention.

FIG. 6 shows a schematic illustrating still another embodiment of a power supply input stage used in a power supply in accordance with the teachings of the present invention. In FIG. 6, the general configuration and functionality share similarities with the circuit shown in FIG. 3. In the depicted embodiment, an AC signal is generated by AC source 102 and rectifier circuit 600 rectifies the AC signal and capacitor 603 smoothes the signal such that a rectified and smoothed or filtered DC signal is generated at DC output 106 at capacitor 603. The rectified and smoothed DC signal at DC output 106 is received by power conversion circuit 208 such that an output is generated at power conversion circuit output 210.

The input inductor 302 of embodiment FIG. 3, however, has replaced by two inductors 602 and 604. As shown, rectifier circuit 600 is coupled between AC source 102 and inductors 602 and 604. In one embodiment, the total inductance of inductors 602 and 604 is not necessarily equal to the inductance of inductor 302. For instance, in one embodiment, one of the inductors 602 and 604 could be designed specifically to have different impedance versus frequency characteristics than the other in order to filter specific EMI frequencies more efficiently. In this embodiment either one or both of inductors 602 and 604 can act as a fuse. Typically the lowest cost solution is to design only one of the inductors 602 and 604 to act as a fuse in order that only one of the inductors 602 or 604 includes flame retardant or heatshrink covering to comply with international safety standards as a fuse component.

In one embodiment, the circuit embodiment of FIG. 6 shares similar limitations as that of the circuit embodiment of FIG. 3 in terms of the input rectifier circuit 600. For instance, in one embodiment, rectifier circuit 600 must be a half wave rectifier circuit in order for the use of either inductor 602 or 604 as a fuse to meet international safety standards as previously described. Rectifier circuit 600 can, however, be a full wave rectifier circuit if a separate fuse component is coupled between the AC source 102 and the input to rectifier circuit 600.

In the foregoing detailed description, the present invention has been described with reference to specific exemplary embodiments thereof. It will, however, be evident that various modifications and changes maybe made thereto without departing from the broader spirit and scope of the present invention. The present specification and figures are accordingly to be regarded as illustrative rather than restrictive.

What is claimed is:

1. A power supply input electromagnetic interference (EMI) filter circuit, comprising:
    an inductor to be coupled to a Line Impedance Stabilization Network (LISN) having a LISN capacitance representative of an alternating current (AC) source capacitance;
    a rectifier having an input coupled to the inductor, the inductor to be coupled between the LISN and the rectifier; and
    a capacitor coupled to an output of the rectifier such that an EMI pi filter is formed with the LISN capacitance, the inductor and the capacitor.

2. The power supply EMI filter circuit of claim 1 wherein the capacitor is adapted to provide bulk storage for a direct current (DC) input of a power supply conversion circuit to be coupled to the capacitor.

3. The power supply EMI filter circuit of claim 2 wherein the power conversion circuit is adapted to provide an output power of less than approximately ten Watts.

4. The power supply EMI filter circuit of claim 2 wherein the capacitor that provides the bulk storage for the DC input of the power supply conversion circuit consists of a single capacitor.

5. The power supply EMI filter circuit of claim 1 wherein the rectifier is half wave rectifier circuit.

6. The power supply EMI filter circuit of claim 5 wherein the half wave rectifier circuit includes a plurality of inputs and a corresponding plurality of outputs, wherein the half wave rectifier circuit comprises one or more diodes coupled between each of the inputs and the corresponding outputs of the half wave rectifier circuit.

7. The power supply EMI filter circuit of claim 1 wherein the rectifier is a full wave rectifier circuit.

8. The power supply EMI filter circuit of claim 1 wherein the inductor is adapted to function as a fuse to limit an abnormal amount of current flow.

9. The power supply EMI filter circuit of claim 8 wherein the inductor is covered with a flame retardant material.

10. The power supply EMI filter circuit of claim 8 wherein the inductor is covered with a heatshrink material.

11. A power supply input electromagnetic interference (EMI) filter circuit, comprising:
 a rectifier having an input to be coupled to a Line Impedance Stabilization Network (LISN) having a LISN capacitance representative of an alternating current (AC) source capacitance;
 an inductor having a first terminal coupled to an output of the rectifier, the rectifier to be coupled between the LISN and the first terminal of the inductor; and
 a capacitor coupled to a second terminal of the inductor such that an EMI pi filter is formed with the LISN capacitance, the inductor and the capacitor.

12. The power supply EMI filter circuit of claim 11 wherein the capacitor is adapted to provide bulk storage for a direct current (DC) input of a power supply conversion circuit to be coupled to the capacitor.

13. The power supply EMI filter circuit of claim 12 wherein the power conversion circuit is adapted to provide an output power of less than approximately ten Watts.

14. The power supply EMI filter circuit of claim 12 wherein the capacitor that provides the bulk storage for the DC input of the power supply conversion circuit consists of a single capacitor.

15. The power supply EMI filter circuit of claim 11 wherein the rectifier is half wave rectifier circuit.

16. The power supply EMI filter circuit of claim 15 wherein the half wave rectifier circuit includes a plurality of inputs and a corresponding plurality of outputs, wherein the half wave rectifier circuit comprises one or more diodes coupled between each of the inputs and the corresponding outputs of the half wave rectifier circuit.

17. The power supply EMI filter circuit of claim 11 wherein the rectifier is a full wave rectifier circuit.

18. The power supply EMI filter circuit of claim 11 wherein the inductor is adapted to function as a fuse to limit an abnormal amount of current flow.

19. The power supply EMI filter circuit of claim 18 wherein the inductor is covered with a flame retardant material.

20. The power supply EMI filter circuit of claim 18 wherein the inductor is covered with a heatshrink material.

21. A power supply input electromagnetic interference (EMI) filter circuit, comprising:
 a first inductor to be coupled to a first line of a Line Impedance Stabilization Network (LISN) having a LISN capacitance representative of an alternating current (AC) source capacitance;
 a second inductor to be coupled to a second line of the LISN;
 a rectifier having first and second inputs coupled to the first and second inductors, respectively, the first and second inductors to be coupled between the LISN and the rectifier; and
 a capacitor coupled to an output of the rectifier such that an EMI filter is formed with the LISN capacitance, the first and second inductors and the capacitor.

22. The power supply EMI filter circuit of claim 21 wherein the capacitor is adapted to provide bulk storage for a direct current (DC) input of a power supply conversion circuit to be coupled to the capacitor.

23. The power supply EMI filter circuit of claim 22 wherein the power conversion circuit is adapted to provide an output power of less than approximately ten Watts.

24. The power supply EMI filter circuit of claim 22 wherein the capacitor that provides the bulk storage for the DC input of the power supply conversion circuit consists of a single capacitor.

25. The power supply EMI filter circuit of claim 21 wherein the rectifier is half wave rectifier circuit.

26. The power supply EMI filter circuit of claim 25 wherein the half wave rectifier circuit includes a plurality of inputs and a corresponding plurality of outputs, wherein the half wave rectifier circuit comprises one or more diodes coupled between each of the inputs and the corresponding outputs of the half wave rectifier circuit.

27. The power supply EMI filter circuit of claim 21 wherein the rectifier is a full wave rectifier circuit.

28. The power supply EMI filter circuit of claim 21 wherein at least one or more of the first and second inductors are adapted to function as at least one or more fuses to limit an abnormal amount of current flow.

29. The power supply EMI filter circuit of claim 28 wherein the at least one or more of the first and second inductors that are adapted to function as the at least one or more fuses to limit the abnormal amount of current flow are covered with a flame retardant material.

30. The power supply EMI filter circuit of claim 28 wherein the at least one or more of the first and second inductors that are adapted to function as the at least one or more fuses to limit the abnormal amount of current flow are covered with a heatshrink material.

31. A power supply input electromagnetic interference (EMI) filter circuit, comprising:
 a rectifier having an input to be coupled to a Line Impedance Stabilization Network (LISN) having a LISN capacitance representative of an alternating current (AC) source capacitance;
 a first inductor having a first terminal coupled to a first output of the rectifier;
 a second inductor having a first terminal coupled to a second output of the rectifier, the rectifier to be coupled between the LISN and the first and second inductors; and
 a capacitor coupled between a second terminal of the first inductor and a second terminal of the second inductor such that an EMI filter is formed with the LISN capacitance, the first and second inductors and the capacitor.

32. The power supply EMI filter circuit of claim 31 wherein the capacitor is adapted to provide bulk storage for a direct current (DC) input of a power supply conversion circuit to be coupled to the capacitor.

33. The power supply EMI filter circuit of claim 32 wherein the power conversion circuit is adapted to provide an output power of less than approximately ten Watts.

34. The power supply EMI filter circuit of claim 32 wherein the capacitor that provides the bulk storage for the DC input of the power supply conversion circuit consists of a single capacitor.

35. The power supply EMI filter circuit of claim 31 wherein the rectifier is half wave rectifier circuit.

36. The power supply EMI filter circuit of claim 35 wherein the half wave rectifier circuit includes a plurality of inputs and a corresponding plurality of outputs, wherein the half wave rectifier circuit comprises one or more diodes coupled between each of the inputs and the corresponding outputs of the half wave rectifier circuit.

37. The power supply EMI filter circuit of claim 31 wherein the rectifier is a full wave rectifier circuit.

38. The power supply EMI filter circuit of claim 31 wherein the inductor is adapted to function as a fuse to limit an abnormal amount of current flow.

39. The power supply EMI filter circuit of claim 38 wherein the inductor is covered with a flame retardant material.

40. The power supply EMI filter circuit of claim 38 wherein the inductor is covered with a heatshrink material.

41. A method, comprising:
rectifying an alternating current (AC) signal from a Line Impedance Stabilization Network (LISN) having a LISN capacitance representative of an AC source capacitance;

filtering the rectified AC signal with a bulk storage capacitor to provide a DC signal to an input of a power conversion circuit; and filtering the electromagnetic interference (EMI) generated by the power converter circuit with an EMI filter that includes the LISN capacitance representative of the AC source capacitance, one or more inductors and the bulk storage capacitor.

42. The method of claim 41 wherein rectifying the AC signal comprises full wave rectifying the AC signal with a full wave rectifier.

43. The method of claim 41 wherein rectifying the AC signal from the LISN comprises half wave rectifying the AC signal.

44. The method of claim 41 further comprising limiting an abnormal amount of current from flowing with at least one of said one or more inductors that are included in the EMI filter.

45. The method of claim 44 further comprising covering the at least one of said one or more inductors with a flame retardant material.

46. The method of claim 44 further comprising covering the at least one of said one or more inductors with a heatshrink material.

* * * * *